United States Patent [19]

Eaton

[11] Patent Number: 4,753,159
[45] Date of Patent: Jun. 28, 1988

[54] AUTOMATED CORN CUTTER

[76] Inventor: William Eaton, Rte. 6, Box 177, Dublin, Ga. 31021

[21] Appl. No.: 890,301

[22] Filed: Jul. 29, 1986

[51] Int. Cl.$^4$ .................. A47J 17/00; A01F 11/06
[52] U.S. Cl. ........................... 99/567; 99/594; 99/596; 130/9 C; 130/9 D
[58] Field of Search ................ 99/537–539, 99/567, 568, 584, 623, 646 R, 594–598; 130/9 D, 9 C, 9 A, 9 R

[56] References Cited

U.S. PATENT DOCUMENTS

| 240,052 | 4/1881 | Stover . | |
|---|---|---|---|
| 247,718 | 9/1881 | Warfield | 130/9 C |
| 258,147 | 5/1882 | Warfield . | |
| 276,054 | 4/1883 | Longsdorf . | |
| 346,585 | 8/1886 | Davison | 130/9 D |
| 1,127,548 | 2/1915 | Turner . | |
| 2,063,483 | 12/1936 | Bulmer | 99/567 |
| 2,566,568 | 9/1951 | Ives | 99/567 X |

Primary Examiner—Timothy F. Simone
Attorney, Agent, or Firm—Dowell & Dowell

[57] ABSTRACT

An automated portable cutting machine for severing kernels from ears of corn and which includes adjustable cob supporting spindles which rotatably support the ear of corn relative to an adjustable cutting element which is longitudinally moved with respect thereto by manual operation of a tracking element with a power shaft driven by the drive source for the rotatable spindles.

15 Claims, 3 Drawing Sheets

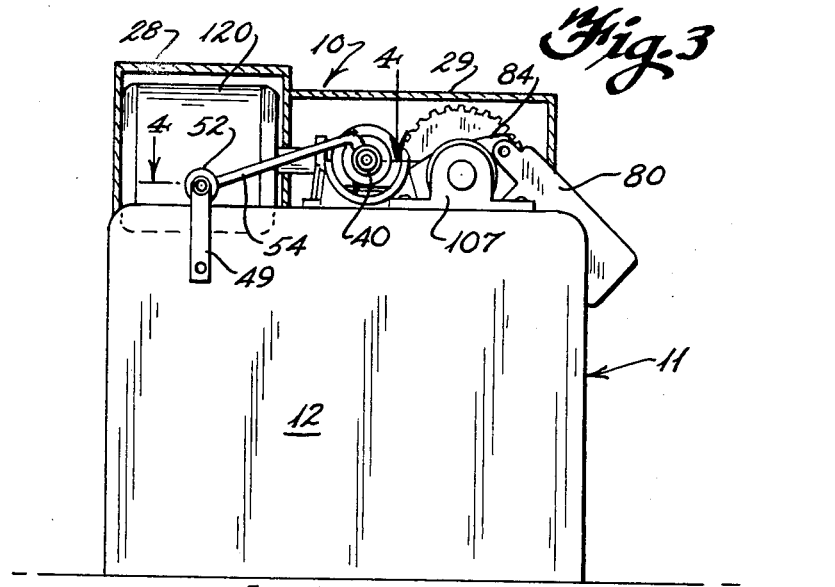
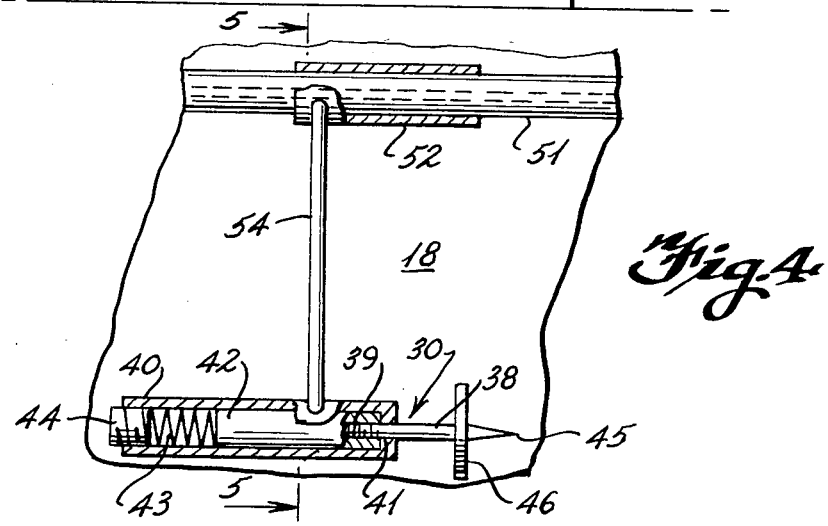
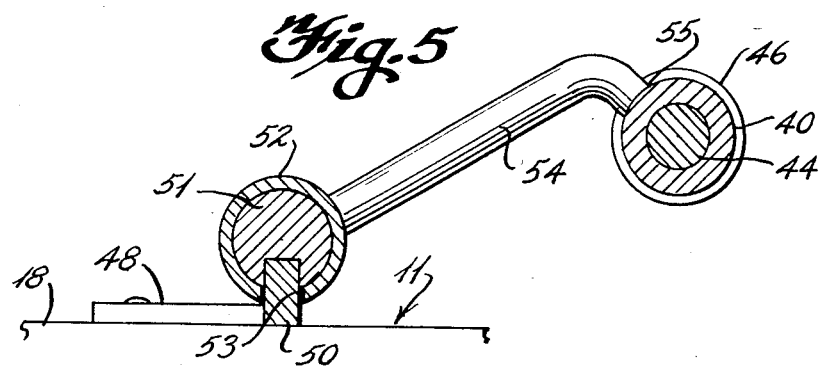

AUTOMATED CORN CUTTER

BACKGROUND OF THE INVENTION

1. Field of the Invention

This invention is generally directed to portable food preparation or kitchen appliances and particularly to automated cutting machines for removing kernels from ears of corn wherein the machines include rotatably driven spindles for supporting the corn relative to a longitudinally movably cutting element which may be selectively adjusted to insure a proper cutting depth for severing the corn kernels from the cobs.

2. History of the Invention

There have been many machines which have been designed and developed for the purpose of removing kernels from ears of corn. Some of these machnes have been particularly designed for industrial usage wherein large and bulky equipment is utilized to process the corn to either obtain the kernels as seeds or feed or to obtain whole kernels which can be canned or frozen for consumer sales and consumption. Many prior art machines have not proved to be efficient or functional as such machines could not be used to remove whole kernels of corn from a cob without either destroying portions of the hulls of the kernels or without removing portions of the husks. Also, many machines are not versatile enough to be utilized on varying sizes of ears of corn and therefore do not adequately remove all the kernels from the cob.

In prior art machines that attempt to use several arcuate cutters to remove the kernels, the curvature of the blades does not adequately match the configuration of the ears of corn being processed thereby causing some kernels to be cut to high so that portions of the kernels remain on the cob and others may not be cut at all. The use of spring-loaded curved blades has not satisfactorily solved these problems.

In addition to the foregoing, too many prior art machines remain very labor intensive and are often times very unsafe to operate. Large and complicated machines which are powered by hand operated cranks require a great deal of physical effort to be expended to operate the machine for each ear of corn being processed. Even with very simplified machines which are processed by hand cranks, such as exemplified by U.S. Pat. No. 240,052 to Stover, require an extreme amount of physical effort to operate. Hand powered machines inherently operate with a great deal of resistance as the movement of the corn cob and cutting mechanism is relatively slow. In effect, the cutting mechanism and ears of corn are being simply pushed at each other thereby causing many of the kernels to be forced from the cobs and not clearly cut therefrom.

As mentioned above, prior art machines are also not safe to operate. Too often, the cutting mechanisms are activated while an operator's hands are either too close thereto or are free to be accidentally placed in a hazardous position. Some addition examples of prior art include U.S. Pat. Nos. 247,718 to Warfield, 258,147 to Warfield, 276,054 to Longsdorf, 346,585 to Davison, 1,127,548 to Turner and 2,566,568 to Ives.

SUMMARY OF THE INVENTION

This invention is directed to a portable appliance for automatically severing the edible kernels from the cobs of ears of corn in which the appliance includes a base portion having a motor assembly mounted thereon which is drivingly connected to one of a pair of axially aligned corn cob support spindles which are rotatable with respect to the base. The motor assembly is also drivingly connected to a longitudinally movable cutter assembly which includes an adjustable cutting element which is supported in cantilevered relationship from a cutter control arm. The cutter control arm is selectively engaged in meshing relationshp with a lead screw driven by the motor assembly so that selective engagement of the control arm with the lead screw will cause the cutting element to be moved along the length of an ear of corn retained between the support spindles whereby the cutting element will sever the kernels of corn from the cob as the cutting element moves longitudinally and the ear of corn rotates with the spindles.

It is the primary object of the present invention to provide a portable kitchen appliance which can be easily and safely used to sever the edible grain or kernels from ears of corn in such a manner that substantially all of the kernels are entirely and cleanly removed from each cob that is placed therein.

It is another object of the present invention to provide an automated cutting appliance which may be used to remove the kernels from ears of corn wherein the ears of corn are positively and securely supported by a pair of opposed and adjustably spaced spindles and wherein the ears are rotated relative to a longitudinally movable cutting element which will cut the kernels from the cobs by a slicing action as the cobs are rotated in relationship to the cutting element so that the kernels are cleanly severed without damage to the hulls thereof.

It is another object of the present invention to provide an automatic apparatus for cutting the kernels from ears of corn in which the corn is supported on rotatable spindles which are powered by a motor and drive assembly which also simultaneously provides power for moving the cutting element longitudinally with respect to the corn.

It is yet another object of the present invention to provide a portable corn cutting appliance wherein the cutting element is adjustably mounted with respect to an ear of corn placed in the appliance so that the relative cutting height of the cutting element can be selectively aligned so that only the edible material is removed from the corn cob.

It is also an object of the present invention to provide a portable kitchen appliance which may be safely used to cut the kernels from ears of corn wherein the cutting element is movably carried by a control arm assembly having a tracking element which is normally biased out of engagement with a drive lead screw so that a positive force must be consciously applied by the operator to engage the tracking element of the control arm with the lead screw in order to cause the cutting elements to move relative to the corn supported by the appliance.

According to yet another embodiment of the invention, a portable automated corn cutting appliance is provided in which power to the motor and drive assembly is controlled by a trigger switch mounted to a control arm which must be positively activated to initiate any cutting or slicing action of the cutting element so that the operator's hands must be engaging the trigger switch at a point remote from the cutting element when the motor and drive unit is activated.

BRIEF DESCRIPTION OF THE DRAWINGS

FIG. 3 is a side view of the portable corn cutting appliance as taken from the left side of FIG. 1.

FIG. 4 is an enlarged partial cross sectional view taken along line 4—4 of FIG. 3 showing the resiliently mounted cob support spindle.

FIG. 5 is an enlarged cross sectional view taken along lines 5—5 of FIG. 4.

BRIEF DESCRIPTION OF THE PREFERRED EMBODIMENT

Figure 1:
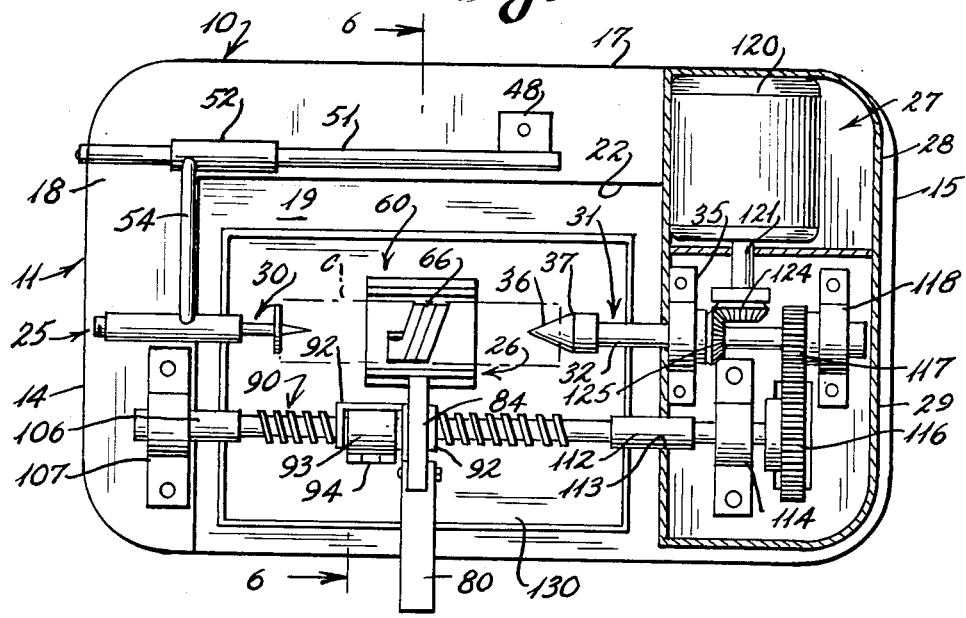
FIG. 1 is a top plan view of the portable corn cutting appliance of the present invention showing an ear of corn (in dotted line) mounted between the rotatable cob supporting spindles and having the housings over the motor and gears shown in cross section.

With continued reference to the drawings, the portable corn cutting appliance 10 of the present invention is shown as having a base portion 11 which is supported by leg members 12 and 13 which extend downwardly from each end 14 and 15 of the base and between each side 16 and 17 thereof. The upper surface 18 of the base includes a recessed area 19 which extends inwardly from side 16 and is defined by end walls 20 and 21 and an elongated side wall 22.

Mounted to the upper surface 18 of the base 11 are a corn cob retaining assembly 25, cutting assembly 26 and motor and drive assembly 27. The motor and drive assembly are shown as being mounted within housings 28 and 29 which are removably mounted to the upper surface 18 of the base.

The corn cob retaining assembly 25 includes a pair of spaced spindle members 30 and 31 which are axially aligned in spaced relationship with respect to one another so as to be cantilevered inwardly from the end walls 20 and 21, respectively, and over the recessed area 19 formed in the base 11.

Spindle member 31 includes a cylindrical shaft 32 having an inner end disposed through an opening 34 in housing 29. The shaft is rotatably carried within and extends through the bearings of a pillow block 35. A tapered corn cob engaging spear 36 having an outwardly extending collar or flange 37 spaced inwardly from the tip thereof is secured to the outer end of spindle 31. The spear or pointed end 36 is utilized to penetrate one end of a corn cob C which is aligned axially between the spindle members 30 and 31. The collar 37 will limit the depth of penetration of the pointed end or tip of spear 36 and prevent any additional lateral displacement or shifting of the corn cob with respect to the spindle 31 after the cob is engaged therewith.

In order to adapt the spindle members 30 to be adjustably movable with respect to a corn cob mounted between the spindles 30 and 31 so as to permit the cob to be placed therebetween or removed therefrom, spindle member 30 is designed to be both yieldable to and adjustably positioned or axially shiftable with respect to spindle member 31. Spindle 30 includes an elongated shaft portion 38 having an inner end 39 which is movably carried within a cylindrical spindle support housing 40. The spindle support housing 40 includes an opening 41 through which the shaft 38 extends. The inner end of the shaft 38 is threadingly received within a piston member 42 that is carried in sliding engagement within the spindle support housing 40. A spring member 43 is positioned between the piston 42 and a closable end wall 44 of the housing 40 and serves to normally urge the spindle member 30 toward the spindle member 31. The outer end of the shaft 38 is tapered to a point 45 and a collar 46 extends outwardly therefrom in spaced relationship with respect to the pointed end 45. The collar 46 will function in a like manner to collar 37 associated with spindle 31 to limit the depth of penetration of the spindle 30 with respect to a corn cob C and thereafter prevent any further lateral displacement of the cob with respect thereto.

In order that spindle member 30 may be freely rotated with respect to the spindle support housing 40, it is preferred that the piston member 42 be of a size to be rotatable within the housing. Generally, the piston will be constructed of a polyethylene or similar desirable plastic material so as to provide its own low friction bearing surface. The piston may also be constructed of a polished metallic material provided that the parts are properly lubricated so as to permit relatively free movement therebetween.

In addition to the yieldable mounting of spindle member 30 relative to spindle member 31 which facilitates the placement and/or removal of a cob therebetween, the present invention provides a mounting assembly for spindle member 30 which will permit spindle member 30 to be variably spaced or positioned relative to spindle member 31. With particular reference to FIGS. 1, 4 and 5, the mounting assembly for spindle member 30 will be described in greater detail. The mounting assembly includes an elongated rail member 50 which is mounted along the upper surface 18 of the base 11 of the corn cutting appliance by means of an upper flange member 48 and a vertically extending flange member 49. The upper portion of the elongated rail member 50 includes an elongated generally cylindrical rod portion 51 over which a tubular sleeve member 52 is slideably positioned as shown in FIG. 5. An elongated channel or opening 53 is provided along the length of the tubular sleeve member 52 so as to provide clearance for the lower portion of the rail member 50. The inner diameter of the tubular sleeve 52 is just slightly greater than the rod portion 51 of the rail member 50 so that the sleeve may be selectively slidingly adjustable along the length of the rail member 50.

Extending outwardly from one side of the sleeve 52 is a generally L-shaped outrigger element 54. The element 54 is connected at its outermost end 55 to the spindle housing 40. The angle of the outrigger element is such that the spindle housing 40 will normally be disposed in an elevated position with respect to the tubular sleeve member 52. In this manner, the edges of the tubular sleeve member adjacent the elongated channel or opening 53 therein will bind against the sides of the elongated rail member 50 with the weight of the outrigger element 54 and spindle housing 40 urging the tubular sleeve into frictional contact therewith. In order to adjust the position of the tubular sleeve element 52 with respect to the rail member, a slight upward pressure on the outrigger element 54 or spindle housing 40 will center the rail member with respect to the elongated opening 43 thereby allowing the tubular member to be slidingly positioned relative to the rail member 50. Thereafter, upon release of the outrigger element 54 or housing 40, the tubular sleeve member will bind against the rail member 50 in a frictionally locked engagement.

The foregoing adjustment allows the spindle member 30 to be selectively oriented with respect to the fixed spindle member 31 so that the spacing therebetween may be appropriately set to accomodate varying lengths of ears of corn.

Figure 6:
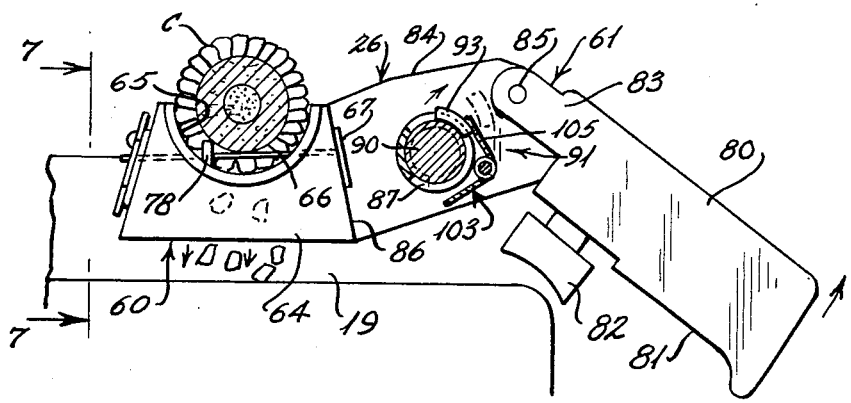
FIG. 6 is an enlarged partial cross sectional view taken along lines 6—6 of FIG. 1 and showing the cutting element and control arm in relationship to an ear of corn and cutter drive lead screw.
Figure 7:
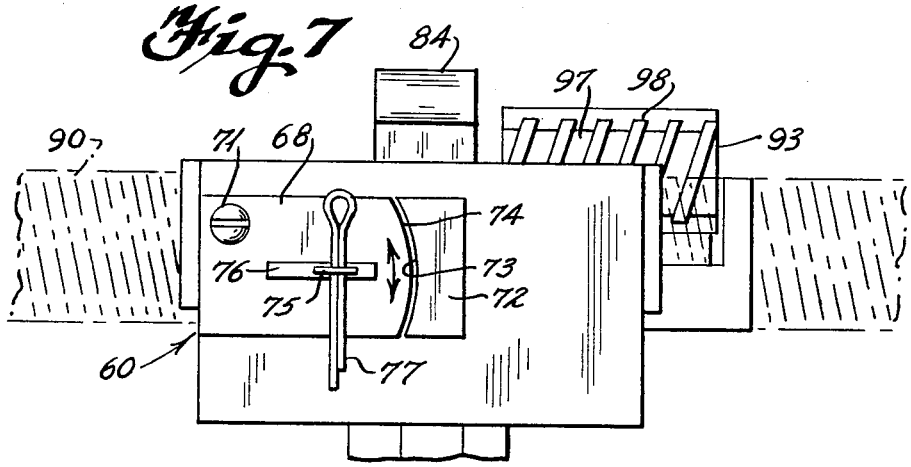
FIG. 7 is an enlarged partial view taken along lines 7—7 of FIG. 6 showing the cutting element adjusting mechanism in greater detail.

With particular reference to FIGS. 1, 2, 6 and 7, the cutting assembly 26 of the present invention will be discussed in greater detail. The cutting assembly includes two primary subassemblies which are the cutter blade subassembly 60 and the control arm subassembly 61. The cutter blade subassembly 60 includes a housing or cradle portion 64 having a generally concave upper surface 65 which is of a size to permit ears of corn to be received therein as shown in FIG. 6. A cutter blade 66 extends across the housing so that portions thereof extend through the space defined within the arcuate upper surface thereof. The cutter blade 66 is fixedly secured at one end thereof to an attachment plate 67 and is movably secured at the other end thereof to an adjustment plate 68. The adjustment plate is retained in locked position against one side 70 of the housing 60 by means of a set screw 71 which extends therethrough. Mounted at one side of the adjustment plate 68 is an abutment member 72 which has a concave surface 73 which is opposed by a convex surface 74 which defines one edge of the adjustment plate 68. The adjustment plate and abutment member are normally spaced with respect to one another with the space created between the surfaces 73 and 74 permitting a limited vertical adjustment of the plate 68 with respect to the abutment member 72. The relative vertical adjustment is shown by the arrow in FIG. 7. The outer end 75 of the cutter blade 66 extends through a slot 76 in the adjustment plate 68 and is secured in place therein by a cotter pin or other locking member 77. Mounted adjacent to the cutter blade within the arcuate upper surface of the housing thereof is a scraper element 78. The scraper element may also be ajustably positioned within the area above the concave upper wall portion of the housing so as to be aligned with the cutter blade in order to remove severed kernels of corn and direct the kernels downwardly into the recessed area 19 of the base assembly.

With particular reference to FIG. 1, the cutter blade is transversely disposed with respect to the axis defined between the spindle members 30 and 31 so that the cutting blade approaches an ear of corn which is to be processed using the appliance of the present invention at an angle relative to the length thereof. As shown in FIG. 6, the blade is adjusted so that the cutting height thereof severs the kernels of corn from the cob at a point which insures that the entire kernel is removed without cutting any portion of the cob. The scraper bar is positioned behind the cutting blade relative to the advancing ear of corn which is to be cut. In this manner, as the kernels are severed, they will be directed outwardly and downwardly into the recessed area of the base for collection.

The cutter blade housing 60 is generally vertically fixed in relationship to the axis defined between the spindle members 30 and 31 with any adjustment relative to the cutter 66 and the ear of corn made by the adjustment plate 68. The housing 60 is carried or cantilevered outwardly from one end of the control arm subassembly generally designated at 61. The control arm subassembly 61 includes a handle member 80 which includes a hand-grip portion 81, control or motor activation trigger or switch 82 and mounting end 83. The mounting end portion 83 of the handle 80 is connected to an intermediate support member 84 by a pin member or locking screw 85. The intermediate support member 84 extends from one end of the handle 80 to the center of one side 86 of the cutting assembly housing 60. The intermediate plate member 84 may either be integrally formed with the side wall 86 of the housing 60 or may be separately secured thereto so as to extend generally outwardly and slightly upwardly therefrom as shown in FIG. 6.

The intermediate support 84 includes a central opening 87 which provides a passage for a drive lead screw 90 which forms part of the motor and drive assembly as will be discussed in greater detail hereinafter. Mounted to the intermediate plate 84 adjacent to the opening 87 is a tracking unit 91. The tracking unit includes a frame 92 to which a follower 93 is pivotally secured by way of hinge assembly 94. The tracking unit frame is formed having a generally smooth and somewhat concave lower surface which is normally supported on the lead screw 90. The follower 93 of the tracking unit is shown in greater detail in FIG. 7 and includes an arcuate inner surface having a series of lands 97 and grooves 98 therein. The lands and grooves 97 and 98 coincide in size and pitch to the lands and grooves 100 and 101, respectively, of the lead screw 90. In this manner, as the follower 93 of the tracking unit 91 is urged toward the lead screw 90, the lands and grooves thereof will mesh with the lands and grooves of the lead screw thereby causing the tracking unit and thus the entire control arm assembly to be driven by the lead screw.

The follower 93 is normally biased out of engagement or away from the lead screw 90 by means of a spring 103. One end of the spring is fixed so as to place tension on the upper end 105 thereof thereby biasing the follwer 93 outwardly away from the lead screw as shown in dotted line in FIG. 6. Operation or movement of the cutter assembly is initiated by manually urging the follower 93 downwardly into engagement with the drive lead screw 90 and thereafter with an opposite hand, engaging the handle assembly 80 and providing power to the motor and drive assembly by activating the drive switch or trigger 82. In this manner, both hands of the operator are assured of being free of the cutter blade during the operation or use of the appliance. Also, the positively spring biased follower 93 will automatically be released from driven engagement with the lead screw 90 in the event manual pressure is not being applied thereto.

As previously stated, the tracking unit frame 92 has an undersurface which is generally smooth and portions thereof are of a size which is greater than the distance between the lands and grooves of the lead screw so that the tracking member may rest against the lead screw without being moved as the lead screw is rotated. The lower surface of the frame 92 will thus normally rest or ride over the outer portion of the lands of the lead screw as it is rotated.

The lead screw 90 is mounted at one end to an enlarged spindle 106 which extends through a pillow block assembly 107 mounted to the upper surface 18 of the base assembly adjacent one side thereof. The enlarged spindle 106 provides an outwardly extending shoulder 108 which will limit the movement of the tracking unit and thus the motor control subassembly relative to the lead screw adjacent the pillow block 107. The second end of the lead screw 90 is mounted to a second spindle 112 which is disposed through an opening 113 through the side wall of housing 29. The spindle 112 is mounted to a shaft which extends through a pillow block assembly 114 which is mounted to the base of the appliance beneath the housing 29. The second end of the lead screw is shown as not having any lands or grooves so that as the tracking unit of the cutter arm control subassembly passes adjacent thereto, any relative movement caused between the engagement of the follower 93 with the lead screw will effectively be terminated and thereby further movement of the control arm with respect to the lead screw is stopped. The enlarged spindle to which the second end of the lead screw is mounted will also provide a positive abuting surface to prevent further lateral movement of the control arm assembly with respect thereto.

In order to provide power to lead screw 90, the drive shaft through the pillow block assembly 114 is mounted at its outermost end to a gear sprocket 116 which is drivingly engaged by an intermediate gear 117 which is carried by another pillow block 118 also mounted to the upper surface of the base of the appliance. A motor 120 is mounted within the housing 28 and includes a drive shaft 121 which extends through aligned openings in the housings 28 and 29. The motor drive shaft has a beveled drive gear 124 attached at its outer end which drive gear meshes with driven beveled gear 125 which is carried by the drive shaft 32 for spindle member 31. In order to drive or power the lead screw and spindle member 31 by the same motor, the drive shaft 32 extends from beveled gear 125 through intermediate gear 117 and into the pillow block assembly 116. In this manner, operation of the motor drive shaft 121 will cause the meshing beveled gears 124 and 125 to rotate spindle member 31. Simultaneously, intermediate gear 117 will mesh with gear sprocket 116 to thereby rotate the lead screw 90. By selectively adjusting the sizes and number of teeth between the various gearing elements, the rate of rotation of the lead screw may be adjusted relative to the rate of rotation of the spindle element 31. It is important that the movement of the cutter blade longitudinally with respect to an ear of corn mounted between the spindle elements be regulated so as to effectively sever all the kernels from the entire surface of the ear of corn as the cutting element is moved longitudinally with respect thereto. In this manner, the corn should be rotated fast enough and/or the cutting blade moved slowly enough that the blade element has an opportunity to engage the entire outer surface of the corn cob from which the kernels of corn will be cut.

Figure 2:
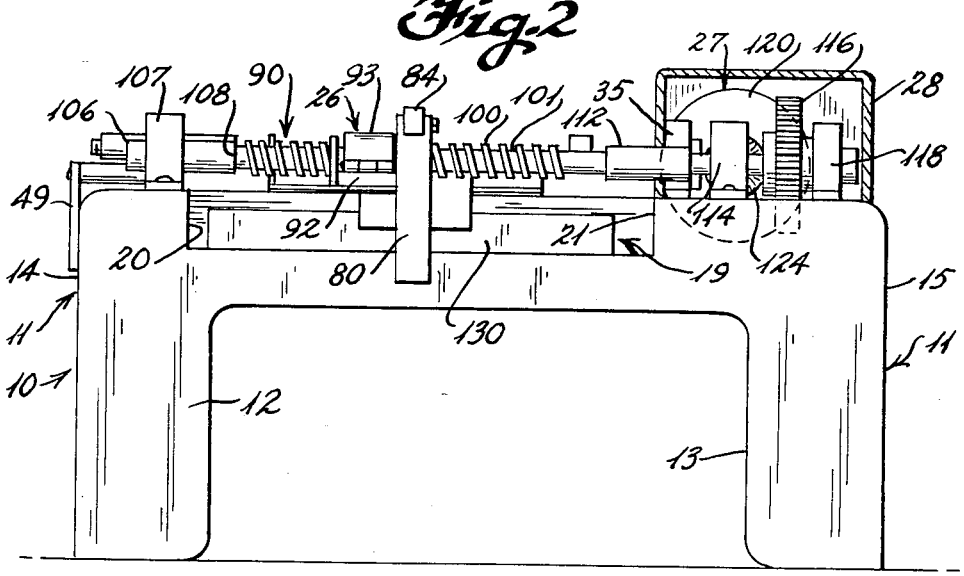
FIG. 2 is a front elevational view of the portable corn cutting appliance of FIG. 1 having portions of the motor housing shown in cross section.

As shown in FIGS. 1 and 2 of the drawings, the appliance of the present invention may also include a tray or pan 130 which is removably mounted within the recessed area 19 of the base. The pan may be used to receive cut kernels collected on the bottom of the recessed area thereby facilitating the clean up and handling of the cut food product.

In the operation of the corn cutting appliance of the present invention, an ear of corn C is placed between spindle members 30 and 31 by initially adjusting the spacing therebetween by utilizing the spindle adjustment mechanism. Thereafter, one end of the ear of corn is lanced over the tip end portion of spindle 30 and the spindle member is urged inwardly of the spindle member housing 40 against the spring 43 so that the other end of the ear of corn may be aligned with the pointed end portion of spindle member 31 and thereafter lanced by such pointed end portion. The cutting assembly is moved to the left of the lead screw 90 as shown in FIG. 1 so that the cutting blade thereof is positioned at one end of the ear of corn. The height of the adjustable blade 66 is then determined and set as previously discussed. The operator then engages one hand over the follower 93 and another hand over the handle portion of the control arm assembly and simultaneously pushes the follower down into the lead screw while pulling the motor activation trigger 82.

Upon activation of the motor, spindle 32 will be powered to rotate the ear of corn between the spindle members 30 and 31 while the lead screw is simultaneously rotated thereby meshing with the follower 93 of the control arm assembly which assembly is thereby moved longitudinally with respect to the ear of corn carried between the spindle members. As the cutter blade 66 is oriented generally diagonally with respect to the kernels which are to be severed, such kernels will be sliced from the corn cob and thereafter directed downwardly into the recessed portion of the base 19 or into an awaiting tray element 130. As the cutting mechanism approaches spindle member 31, the tracking mechanism of the control arm assembly will automatically disengage from the lead screw as the lead screw is not provided with lands and grooves adjacent the remote end thereof.

In addition to the foregoing, should at any time the operator release either the pivotable follower 93 or the motor power trigger 82, the entire cutting operation would cease as further advancement of the cutting element with respect to the rotating ear of corn carried by the spindle members 30 and 31 would be immediately stopped. In this manner, the appliance reduces the possibility of accidental injury to the hand of the operator.

I claim:

1. An apparatus for cutting the kernels from ears of corn comprising a base, a cutting assembly mounted to said base, a corn cob support assembly mounted to said base, said corn cob support assembly including first and second rotatable spindle means which are axially aligned in spaced relationship with one another, means for adjustably mounting said first spindle means in horizontally spaced relationship to said second spindle means above said base, motor means, first drive means connected to said motor means so that said first and second spindle means are rotatably driven thereby when an ear of corn is mounted between said first and second spindle means, said cutting assembly including a cutter means and a cutter control means, said cutter means including a blade means, means for selectively adjusting the height of said blade means with respect to said first and second spindle means, a second drive means, said cutter control means including a support means extending in proximate relationship to said second drive means, tracking means carried by said support means, said tracking means being selectively engageable with said second drive means to thereby move said support means and said cutter means longitudinally between said first and second spindle means, biasing means carried by said support means for normally urging said tracking means away from said second drive means, and means for drivingly connecting said second drive means to said motor means.

2. The cutting apparatus of claim 1 in which said cutter control means includes a handle means mounted to said support means so as to extend outwardly thereof, and switch means carried by said handle means for selectively operating said motor means.

3. The cutting apparatus of claim 2 in which said first spindle means is longitudinally movably carried within a spindle housing and resilient means mounted within said spindle housing for normally urging said first spindle means outwardly of said spindle housing and toward said second spindle means.

4. The cutting apparatus of claim 1 including a recessed area within said base, said recessed area being oriented beneath said first and second spindle means so as to receive kernels severed from an ear of corn carried between said first and second spindle means.

5. The cutting apparatus of claim 1 in which said cutter means includes a housing having an upper recessed portion, said blade means being transversely disposed across said upper recessed portion of said housing so that said blade means will be transversely oriented with respect to an ear of corn mounted between said first and second spindle means.

6. The cutting apparatus of claim 5 in which said means for selectively adjusting said blade means includes a first plate means slideably carried by said housing of said cutter means and abutment means for limiting the vertical movement of said first plate means relative to said housing.

7. The cutting apparatus of claim 1 in which said second drive means includes a lead screw member having a spiral groove formed along the outer surface thereof, said tracking means of said cutter control means including at least one projection which is cooperatively receivable within said groove of said lead screw so that said tracking means may be selectively moved longitudinally of said lead screw when said tracking means is urged against said lead screw.

8. An apparatus for cutting the kernels from ears of corn comprising a base, a cutting assembly mounted to said base, a corn cob support assembly mounted to said base, said corn cob support assembly including first and second rotatable spindle means which are axially aligned in spaced relationship with one another, adjustable mounting means for supporting said first spindle means above said base, said adjustable mounting means including guide means connected to said base, a slide means movably connected to said guide means so as to be selectively adjustable with respect thereto, a spindle housing carried by said slide means, said first spindle means being rotatably mounted within said spindle housing, motor means, first drive means for connecting said second spindle means to said motor means so that said second spindle means is rotatably driven by said motor means, said cutting assembly including a cutter means and a cutter control means, said cutter means including a housing having a concave upper recessed portion which defines a space which is generally axially aligned with said first and second spindle means, blade means disposed across said concave recessed portion of said housing, means for selectively adjusting the height of said blade means within said recessed portion of said housing, a second drive means mounted to said base, said cutter control means including a support means extending in encircling relationship with respect to said second drive means, tracking means carried by said supoprt means for selectively engaging said second drive means to thereby move said support means and said cutter means longitudinally between said first and second spindle means, means carried by said support means for normally urging said tracking means away from said second drive means, and intermediate drive means for drivingly connecting said second drive means to said motor means.

9. The cutting apparatus of claim 8 in which said cutter control means includes a handle means mounted to said support means so as to extend outwardly thereof, and switch means carried by said handle means for selectively operating said motor means.

10. The cutting apparatus of claim 9 in which said first spindle means is longitudinally movably carried within said spindle housing and resilient means mounted within said spindle housing for normally urging said first spindle means outwardly of said spindle housing and toward said second spindle means.

11. The cutting apparatus of claim 8 including a recessed area within said base, said recessed area being oriented beneath said first and second spindle means so as to receive kernels severed from an ear of corn carried between said first and second spindle means.

12. The cutting apparatus of claim 11 including a pan means slideably disposed within said recessed area of said base.

13. The cutting apparatus of claim 8 in which said blade means is transversely disposed across said concave upper recessed portion of said housing of said cutter means os that said blade means will be transversely oriented with respect to an ear of corn mounted between said first and second spindle means.

14. The cutting apparatus of claim 13 in which said means for selectively adjusting said blade means includes a first plate means slideably carried by said housing of said cutter means, a second plate means fixedly secured to said housing adjacent said first plate means, said second plate means having edge portions which limit the vertical movement of said first plate means.

15. The cutting apparatus of claim 8 in which said second drive means includes a lead screw member having a spiral groove formed along the outer surface thereof, said tracking means of said cutter control means including at least one projection which is cooperatively receivable within said groove of said lead screw so that said tracking means may be selectively moved longitudinally of said lead screw when said tracking means is urged against said lead screw.

* * * * *